(12) United States Patent
Sizer et al.

(10) Patent No.: US 7,637,105 B2
(45) Date of Patent: Dec. 29, 2009

(54) SMART MEMORY ALLOY CONTROL

(75) Inventors: Geoffrey David Sizer, Chicago, IL (US); Benjamin David Ford, Chicago, IL (US); Romain Nicolas Cazalis, Colomiers (FR)

(73) Assignee: Telezygology Inc., Chicago, IL (US)

( * ) Notice: Subject to any disclaimer, the term of this patent is extended or adjusted under 35 U.S.C. 154(b) by 23 days.

(21) Appl. No.: 11/910,624

(22) PCT Filed: Apr. 4, 2006

(86) PCT No.: PCT/AU2006/000440

§ 371 (c)(1),
(2), (4) Date: Oct. 4, 2007

(87) PCT Pub. No.: WO2006/105588

PCT Pub. Date: Oct. 12, 2006

(65) Prior Publication Data

US 2008/0190186 A1 Aug. 14, 2008

(30) Foreign Application Priority Data

Apr. 4, 2005 (AU) ............................. 2005901638

(51) Int. Cl.
*F01B 29/10* (2006.01)

(52) U.S. Cl. ........................................ 60/528; 600/145
(58) Field of Classification Search .................. 73/146, 73/146.5; 600/145; 60/528
See application file for complete search history.

(56) References Cited

U.S. PATENT DOCUMENTS

| | | | |
|---|---|---|---|
| 4,930,494 A | 6/1990 | Takehana et al. | |
| 6,019,113 A | 2/2000 | Allston et al. | |
| 7,197,921 B2 * | 4/2007 | Kramer | ........................ 73/146 |

FOREIGN PATENT DOCUMENTS

WO WO 2004/01235 A1 12/2003

\* cited by examiner

*Primary Examiner*—Andre Allen
(74) *Attorney, Agent, or Firm*—Heather A. Kartsounes

(57) ABSTRACT

The invention relates to a method for improving performance and life of a material adapted to contract when heated to a critical temperature such as shape memory alloy wire (SMA). The method includes the steps of measuring ambient temperature before activation, measuring voltage applied to the SMA wire and/or current flowing in the SMA wire, calculating power and energy required to heat the material from the ambient to the critical temperature and providing the calculated power and energy.

6 Claims, 3 Drawing Sheets

SMART MEMORY ALLOY CONTROL

FIELD OF THE INVENTION

This invention relates to shape memory alloy material and in particular to shape memory alloy wire.

BACKGROUND OF THE INVENTION

Shape memory alloys are known and are usually made predominantly or wholly of titanium and nickel. They may also include other material, such as aluminium, zinc and copper. A shape memory alloy is capable of adopting one shape below a predetermined transition temperature (Martensitic) and changing to a second shape once its temperature exceeds the transition temperature (Austenitic). Conversely, when the shape memory alloy cools below the transition temperature, it is capable of adopting the first shape again. In connection with the various aspects of the present invention, the shape memory alloy contracts when heated in situ. Shape memory alloy wire currently available, such as that sold under the name Nitinol, is capable of contracting by about 3% when activated by heating.

Activation of shape memory alloy (SMA) such as Nitinol is preferably achieved through electrical resistance heating.

Shape memory alloy wire is known to exhibit a number of behavioural characteristics which may affect performance and life of the wire.

OBJECT OF THE INVENTION

It is an object of this invention to maximise SMA performance and SMA life.

DISCLOSURE OF THE INVENTION

It has been observed that fatigue can play a part in performance and longevity. The life of an SMA element used in repetitive cycling application has been observed to be closely correlated to peak SMA stress, which accordingly should be contained within limits to avoid premature failure. Life is also affected by working recovered strain. Strain may be regarded as the change in length of an SMA wire when activated, divided by the normal length of the wire, expressed as a percentage. The larger the percentage strain, the more detrimental the effect on the wire, and the shorter the life of the wire will be. Minimising SMA stress and strain may lead to an increase in SMA working life.

It has been noted that the peak temperature to which SMA wire is heated to cause the Austenite to Martensite transition should be constrained within a safe operating limit to avoid degradation of SMA operating life.

Voltage should be taken into consideration. An SMA element may be powered from a range of supply voltages. As an example, aircraft and automotive equipment commonly experience 20% or more variation in supply voltage, which could result in 45% or higher energy variations in an SMA element with a fixed applied voltage profile. Ideally, in order to optimise operation, supply voltage variations should be compensated for, to ensure consistent power delivery regardless of power supply voltage level. It is contemplated that by measuring supply voltage and adjusting SMA power delivery, for example by using pulse width modulation (pwm) control, consistent power delivery may be delivered over a wide range of supply voltage variations.

Ambient temperature needs to be taken into account. As indicated above, the transition from Martensitic (cold, long) to Austenitic (hot, short) states is achieved by heating the SMA element to a critical transition temperature, such as 90 degrees C. Heating is typically carried out by passing an electric current through the SMA element. For a given rate of power delivery, the time taken for the temperature of the SMA element to rise to the critical transition temperature will depend on the starting, or ambient, temperature. For example, if the temperature is relatively low, a larger amount of energy will need to be delivered to the shape memory alloy wire to heat it to the desired temperature. Conversely, if the temperature is high, the amount of energy to be delivered to the shape memory alloy wire in order to cause it to contract will be less. To achieve consistent operation, the power and energy delivered to the SMA element must be adjusted in accordance with the SMA starting temperature, which will be close to the ambient temperature in the vicinity of the SMA element.

Another factor to be considered is aging. When used in repetitive cycles, the characteristics of the SMA element may change as the cycle count increases. In particular, the length of the Austenitic (hot) state may decrease with increasing cycle count, typically by 0.5 to 1.0% after tens of thousands of cycles under significant stress. In addition, the amount of energy and/or temperature increase required to achieve the Martensitic to Austenitic conversion can increase with cycle count, as may the force required to rebias the SMA element to the extended length Martensitic state after cooling.

The fastening system of the invention may also include a temperature sensor for sensing the temperature of the shape memory alloy wire in the preferred embodiments. This can adjust the amount of energy applied to the shape memory alloy wire, depending on sensed temperature, to take into account varying conditions. A temperature sensor can enable feedback and cause adjustment of power delivery in this regard.

In the present invention, some or (optionally) all these factors are taken into account. Accordingly, the present invention provides a method for improving performance and/or life of smart memory alloy material adapted to contract when heated to a critical temperature, the method including the following steps:

i. measuring ambient temperature before activation;
ii. measuring voltage applied to the material and/or current flowing in the material;
iii. calculating power and/or energy required to heat the material from the ambient to the critical temperature; and
iv. providing the calculated power and energy.

wherein in step (iii) the power when calculated is calculated according to the formula:

$$PWM_{Compensated} = PWM_{Nominal} \times (Voltage_{Nominal})^2 / (Voltage_{Loaded})^2$$

where:

$Voltage_{Nominal}$ is nominal power supply voltage value

PWM is pulse width modulation; and the energy when calculated is calculated according to the formula:

$$PWM_{Compensated} = PWM_{Nominal} \times (Temp_{Activation} - Temp_{Ambient}) / (Temp_{Activation} - Temp_{Nominal})$$

where:

$Temp_{Nominal}$ is nominal temperature and is set to 25° C.
$Temp_{Activation}$ is the critical temperature at which the material is adapted to contract and is set to 95° C.
PWM is pulse width modulation Preferably, the material adapted to contract when activated is SMA wire. Preferably, prior to SMA activation, the ambient temperature in the vicinity of the SMA element is measured and the difference between the ambient and the critical temperatures is used to calculate the power and energy required to be delivered to raise the SMA temperature to the critical temperature within a specified actuation time.

The ambient temperature may be measured in any suitable way.

In step (ii), the voltage applied to the material is measured and/or the current flowing in the material is measured. In one embodiment, both voltage and current are measured. In this embodiment, it is possible to calculate the resistance of the SMA wire in situ. Especially where the SMA resistance is already known, in another embodiment it is preferred to measure only voltage, since it is then possible to calculate the resultant current when the SMA wire is energised or activated. In a further embodiment, where the SMA resistance is known, it is preferred to measure only the current flowing in the SMA wire.

The measurement of voltage and/or current and the calculation of power and energy required to heat the material from the ambient to the critical temperature are carried out in any appropriate way.

When the method of the invention is used in connection with a mechanism, which includes a microprocessor, the microprocessor may control energy delivery to the SMA wire, preferably by a temperature-dependent algorithm. The microprocessor can also sense the state of the mechanism and whether it is engaged or not. The microprocessor may report this, along with secondary sensed information, to a network of which the mechanism forms a part. The mechanism may be, for example, a fastener.

It is further preferred that the SMA supply voltage is measured under load at the commencement of SMA activation, and the SMA power delivery profile is adjusted, eg by using pwm control to ensure that the specified power and energy are applied.

Sensors preferably monitor mechanism operation in a fastener or other device using the method of the invention. The sensors may detect the location of moving parts within the mechanism. Typically, a sensor may be provided to detect full travel of the mechanism and de-energise the SMA element at that time. The time elapsed between the commencement of application of power to the SMA element and the completion of full travel of the mechanism may be measured and compared with target values.

Sensors may also be important to sense that each activation has actually taken place. Sensors may be used to measure the degree of strain in or change in length of an SMA element. Feedback from such sensors can be useful to indicate compensation required in order to optimise performance, for example, or to enable the application of minimum energy to achieve the result, with the prospect of maximising lifetime of the SMA element.

If necessary, power and energy delivery may be adjusted at the start of each cycle in order to achieve the desired target for subsequent cycles. In this way, operation may adaptively track any changes in the SMA element or mechanism characteristics, in order to maintain consistent operation over time. Each time drive parameters are modified, they may be stored in, for example, a non-volatile FLASH memory so as to be preserved through power cycles.

It is to be appreciated that it may be important to compensate for voltage variation, because the resulting energy variation in the SMA wire is approximately proportional to its square value.

For the voltage compensation to be as accurate as possible, the power supply should be measured when loaded. Consequently, when the SMA wire is in a mechanism, the SMA wire is preferably turned on for a short time, typically 15 microseconds, so that the loaded power supply may be measured. This measurement enables the fastener to take into account all voltage drops in connecting wires and protection devices, such as diodes, fuses and filters.

The implementation of compensation according to the method of the invention may provide a number of benefits, such as optimising performance, and design, maximising lifetime and determining preventative maintenance.

A mechanism using SMA elements and to which the method of the invention is applied may achieve operating performance targets throughout its operating life, over a full specified range of operating temperature and voltage ranges.

By compensating for change of operating stroke with aging, it may be possible to avoid the need to design a mechanism with excess initial travel, to ensure that the mechanism operates correctly throughout its operating life. If a sensor is provided to truncate the SMA activation, as soon as it detects that a mechanism has operated, over-travel of the mechanism in its early life can be avoided.

BRIEF DESCRIPTION OF THE DRAWING

The invention will now be described in connection with a non-limiting embodiment thereof as illustrated in the accompanying drawings, in which.

DETAILED DESCRIPTION OF THE DRAWING

Figure 1:
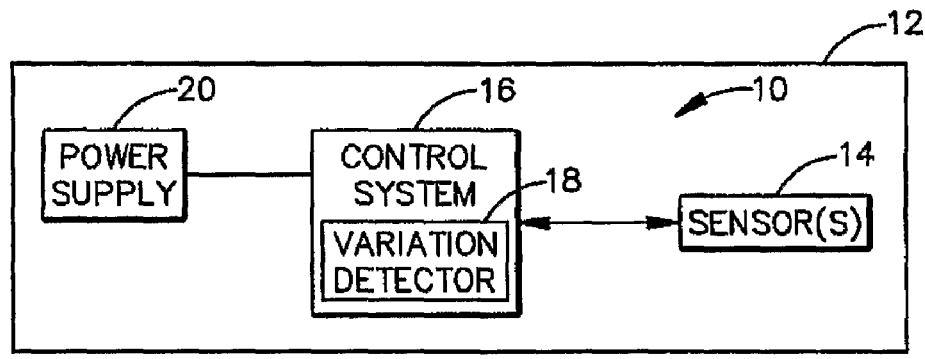
FIG. 1 shows in flow chart form an embodiment of the method of the invention.
Figure 2:
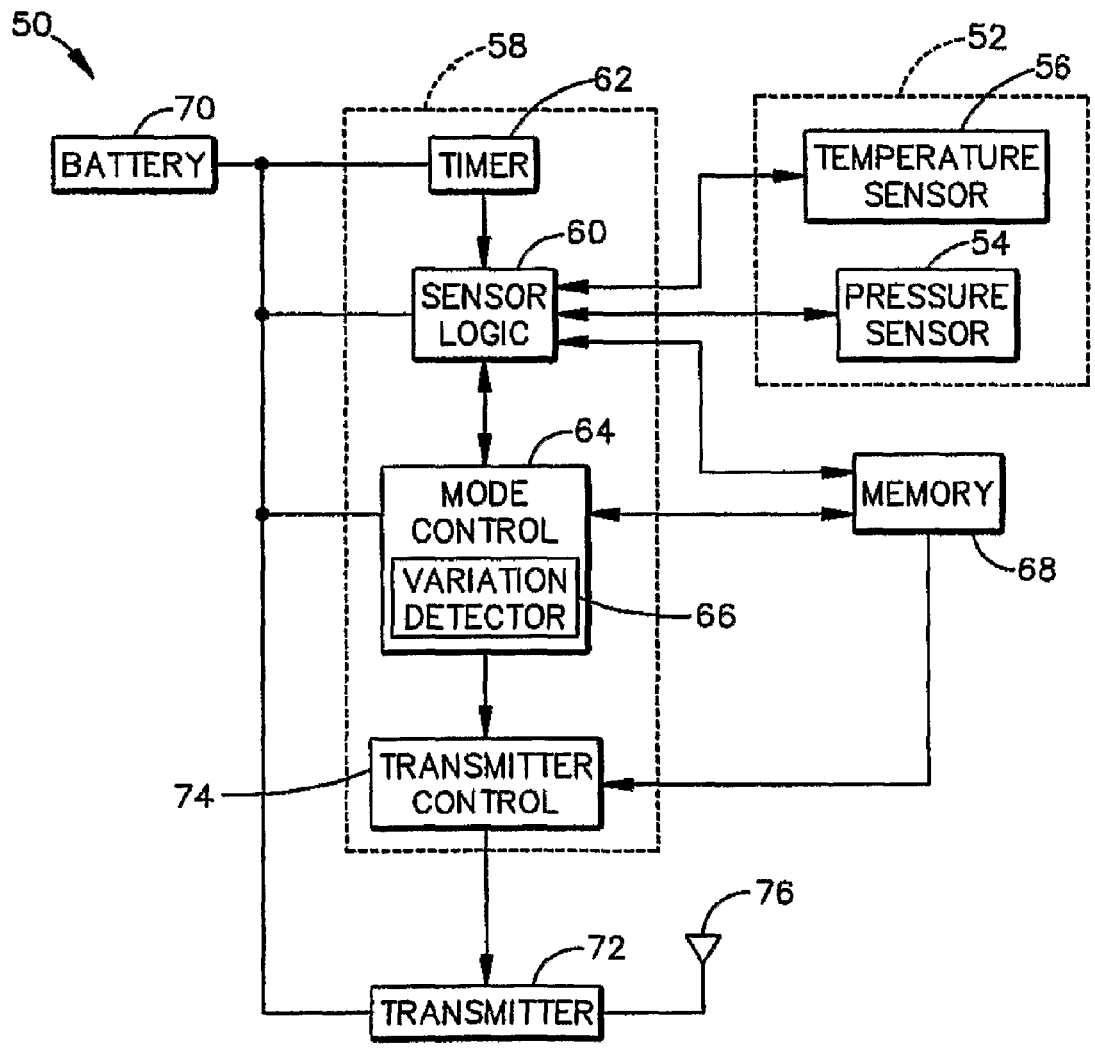
Figure 3:
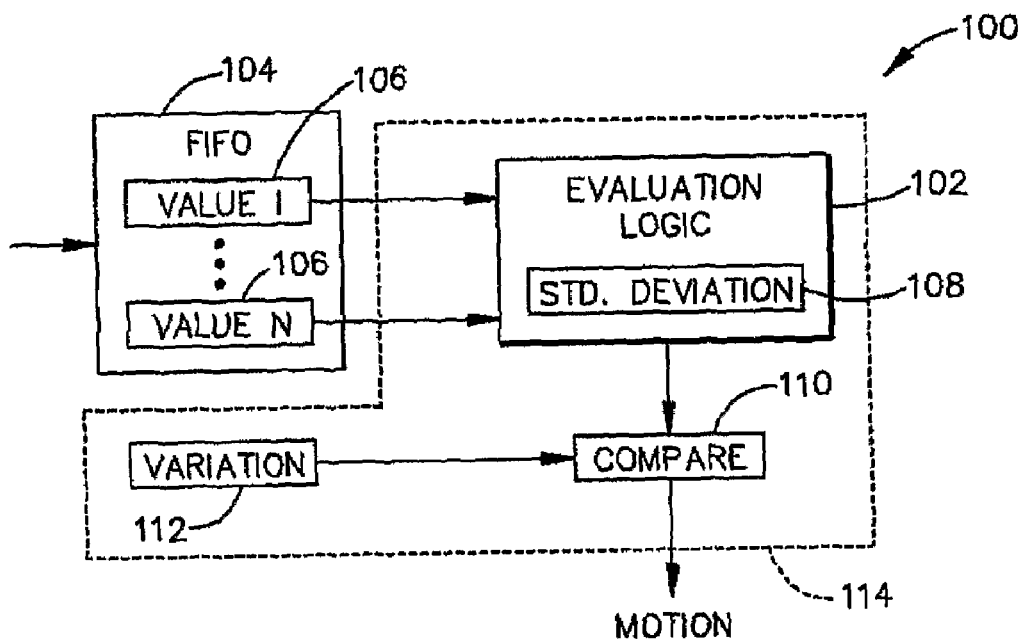
Figure 4:
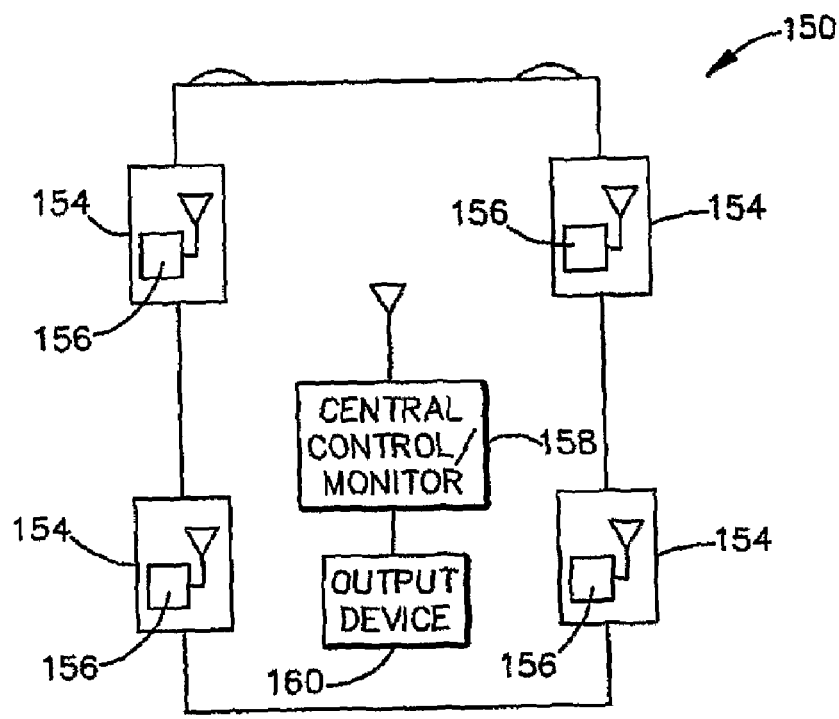
Figure 5:
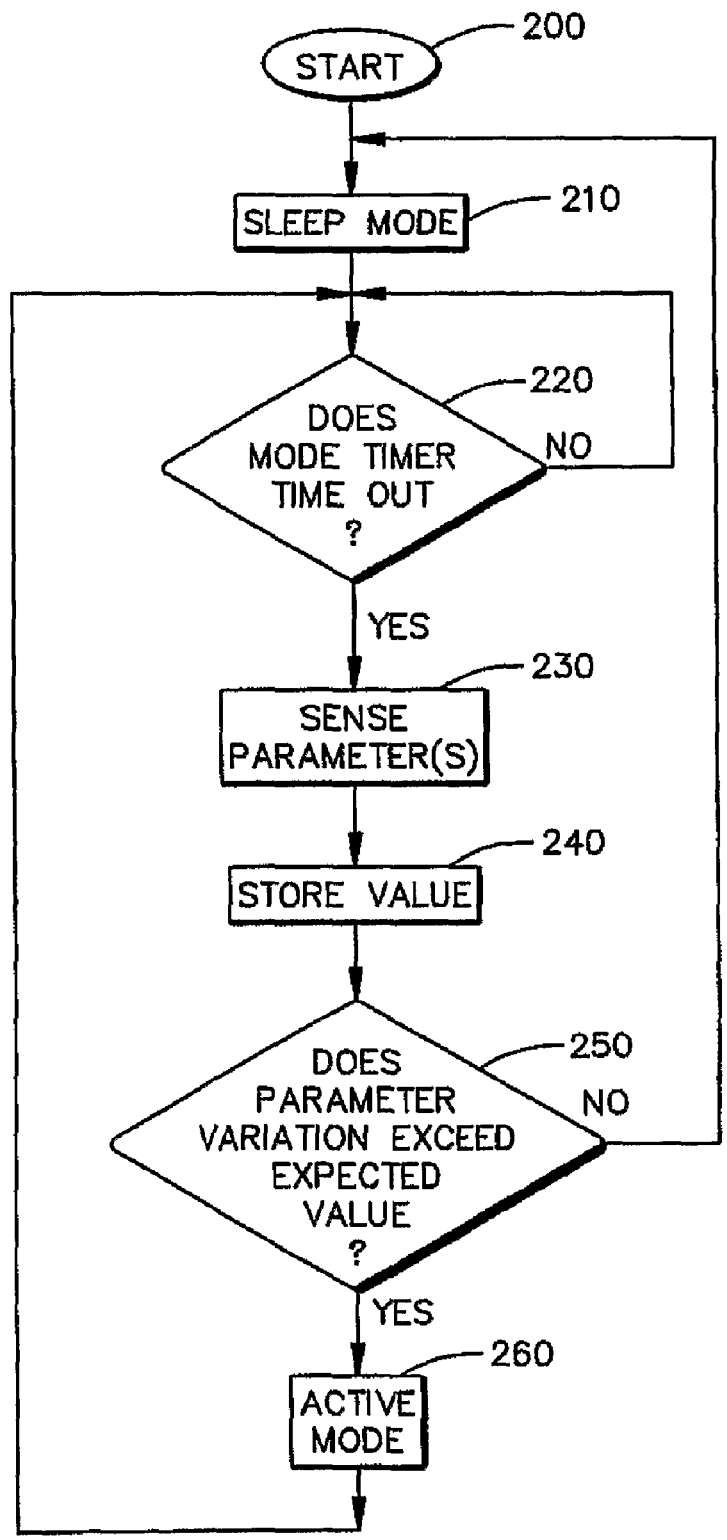

Referring to FIG. 1, the flow chart shows optimisation of the amount of energy delivered to an SMA wire, in order for the wire to be activated efficiently. The energy is calculated on the basis of external conditions and SMA aging. For example, the SMA wire may be referred to any suitable example of the actuating means disclosed in International Patent Application No. WO 2005/047714, the contents of which are incorporated herein by reference. Versions of the fastener shown in FIGS. 5 to 13, 17 to 33 or 41 to 46, for example, may be suitable. The nominal temperature is chosen as 25° C. The activation temperature for typical SMA is 95° C.

For a typical fastener application, nominal PWM is 20%, although this will vary depending on supply voltage and the length and hence resistance of the SMA wire. Nominal PWM is used to calculate the compensated PWM using the below formula:

$$PWM_{Compensated} = PWM_{Nominal} \times (Temp_{Activation} - Temp_{Ambient})/(Temp_{Activation} - Temp_{Nominal})$$

Where:
   $Temp_{Nominal}$ is the profile's nominal temperature and is set to 25° C.
   $Temp_{Activation}$ is the SMA's activation temperature and is set to 95° C.
   PWM is pulse width modulation For a typical measured operating temperature of 30° C., the compensated PWM value is calculated as compensated PWM=20%×(95−30)/(95−25)=18.6%

Furthermore, in order to take into account all voltage drops in the mechanism and compensate PWM, loaded power supply is measured across the SMA after being turned on for approximately 15 microseconds. The compensated PWM can be calculated according to the following formula:

$$PWM_{Compensated} = PWM_{Nominal} \times (Voltage_{Nominal})^2 / (Voltage_{Loaded})^2$$

Where:
- Voltage$_{Nominal}$ is the profile's nominal power supply voltage value
- PWM is pulse width modulation Power supply voltage can be measured, for example, by using an analogue to digital converter contained within a microcontroller. As an alternative to measuring power supply voltage, SMA current can be measured, for example by using an analogue to digital converter to measure the voltage drop across a sense resistor wired in series with the SMA wire. These parameters are related by the resistance of the SMA wire, using Ohms Law. Those skilled in the art will appreciate that the power dissipated in the SMA may be determined by a multiplicity of methods, any one of which would allow the compensation methis to be implemented.

If the SMA element is driven using only minimum power required to achieve operation, the SMA element will be subject to minimum stress, temperature rise and percentage of Martensitic to Austenitic conversion required to achieve performance targets. Minimisation of each of these parameters may have a beneficial effect on the life cycle of an SMA element, thereby maximising the number of operating cycles which can be achieved for the mechanism.

If SMA drive parameter settings required to achieve a particular goal are compared, deviation of those parameters beyond predetermined limits may be used to predict impending failure of the SMA element or the mechanism. Deviation beyond chosen limits may be used as the basis for scheduling future maintenance activities. Deviation of a larger scale may indicate that immediate replacement is required.

It will be appreciated that changes may be made to the embodiments described herein without limiting the spirit and scope of the invention.

INDUSTRIAL APPLICABILITY

As will be readily appreciated by those skilled in the various arts, the invention disclosed herein is not limited to the examples set out and has wide applications in many areas, representing significant advances in the relevant art. In particular, the invention provides a fastener which is far more sophisticated compared to prior art fasteners, permitting the application of modern technology.

The invention claimed is:

1. A method for improving performance and life of a shape memory alloy material adapted to contract when heated to a critical temperature; the method including the following steps:
   (i) measuring ambient temperature before activation;
   (ii) measuring voltage applied to the material and/or current flowing in the material;
   (iii) calculating power and/or energy required to heat the material from the ambient to the critical temperature; and
   (iv) providing the calculated power and/or energy;
   wherein in step (iii) the power when calculated is calculated according to the formula:

$$PWM_{Compensated} = PWM_{Nominal} \times (Voltage_{Nominal})^2 / (Voltage_{Loaded})^2$$

where:
- Voltage$_{Nominal}$ is nominal power supply voltage value
- PWM is pulse width modulation; and the energy when calculated is calculated according to the formula:

$$PWM_{Compensated} = PWM_{Nominal} \times (Temp_{Activation} - Temp_{Ambient}) / (Temp_{Activation} - Temp_{Nominal})$$

where:
- Temp$_{Nominal}$ is nominal temperature and is set to 25° C.
- Temp$_{Activation}$ is the critical temperature at which the material is adapted to contract and is set to 95° C.
- PWM is pulse width modulation.

2. The method of claim 1 wherein in step (iii) both power and energy are calculated.

3. The method of claim 1, when used in connection with a fastening system.

4. The method of claim 1, when used in connection with a fastening system which includes at least one sensor monitoring mechanism.

5. The method of claim 1, wherein in step (iii) energy is calculated and provided via a microprocessor.

6. The method of claim 2, which includes the step of the microprocessor sensing or reporting, or sensing and reporting, state of the fastening system.

* * * * *